United States Patent
Yoshizawa

(10) Patent No.: US 9,977,458 B2
(45) Date of Patent: May 22, 2018

(54) CALCULATION DATA PRINTING APPARATUS, CALCULATION DATA PRINTING METHOD AND COMPUTER-READABLE STORAGE MEDIUM

(71) Applicant: CASIO COMPUTER CO., LTD., Shibuya-ku, Tokyo (JP)

(72) Inventor: Hiroaki Yoshizawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

(21) Appl. No.: 15/392,477

(22) Filed: Dec. 28, 2016

(65) Prior Publication Data
US 2017/0205844 A1 Jul. 20, 2017

(30) Foreign Application Priority Data
Jan. 15, 2016 (JP) ................................. 2016-006639

(51) Int. Cl.
- *H04N 1/00* (2006.01)
- *G06C 11/04* (2006.01)
- *G06F 15/02* (2006.01)
- *G06C 15/08* (2006.01)

(52) U.S. Cl.
CPC .......... *G06C 11/04* (2013.01); *G06F 15/0233* (2013.01); *H04N 1/00015* (2013.01); *H04N 1/00068* (2013.01); *H04N 1/00082* (2013.01); *H04N 1/00384* (2013.01); *G06C 15/08* (2013.01)

(58) Field of Classification Search
CPC .......... H04N 1/00015; H04N 1/00068; H04N 1/00082; G06C 11/04
See application file for complete search history.

(56) References Cited

U.S. PATENT DOCUMENTS 4,455,607 A * 6/1984 Watson ................... G06F 15/02
708/130

FOREIGN PATENT DOCUMENTS

| JP | 03040066 A | 2/1991 |
| JP | 08241285 A | 9/1996 |
| JP | 10241055 A | 9/1998 |

* cited by examiner

*Primary Examiner* — Toan Ly
(74) *Attorney, Agent, or Firm* — Holtz, Holtz & Volek PC

(57) ABSTRACT

According to one embodiment, a calculation data printing apparatus includes a printer and a processor. The processor is configured to execute processes of inputting a plurality of calculation data in accordance with a user operation; causing the printer to print, as first print data, the plurality of calculation data, and calculation result data of the plurality of calculation data; changing at least one of the plurality of calculation data in accordance with a user operation; and causing the printer to print, as second print data, at least one calculation data including the changed calculation data and calculation result data of the plurality of calculation data at least one of which is changed, without printing at least one of the plurality of calculation data printed as the first print data.

18 Claims, 9 Drawing Sheets

| | BEFORE CORRECTION | | | AFTER CORRECTION | |
|---|---|---|---|---|---|
| No. | CALCULATION DATA | CORRECTION FLAG | No. | CALCULATION DATA | CORRECTION FLAG |
| 1 | 1+ | | 1 | 1+ | |
| 2 | 2+ | | 2 | 2+ | |
| 3 | 3+ | | 3 | 9+ | ✓ |
| 4 | 4+ | | 4 | 4+ | |
| 5 | 5+ | | 5 | 5+ | |
| 6 | 6+ | | 6 | 6+ | |
| 7 | * | | 7 | * | ✓ |

(B)

| | BEFORE CORRECTION | | | AFTER CORRECTION | |
|---|---|---|---|---|---|
| No. | CALCULATION DATA | CORRECTION FLAG | No. | CALCULATION DATA | CORRECTION FLAG |
| 1 | 1+ | | 1 | 1+ | |
| 2 | 2+ | | 2 | 2+ | |
| 3 | 3+ | | 3 | 3+ | |
| 4 | 4+ | | 4 | 40+ | ✓ |
| 5 | 5+ | | 5 | 5+ | |
| 6 | 6+ | | 6 | 60+ | ✓ |
| 7 | * | | 7 | * | ✓ |

(C)

| | BEFORE CORRECTION | | | AFTER CORRECTION | |
|---|---|---|---|---|---|
| No. | CALCULATION DATA | CORRECTION FLAG | No. | CALCULATION DATA | CORRECTION FLAG |
| 1 | 100+ | | 1 | 100+ | |
| 2 | 100+ | | 2 | 100+ | |
| 3 | 300+ | | 3 | 300+ | |
| 4 | 200+ | | 4 | 200+ | |
| 5 | ◇/# | | 5 | ◇/# | |
| 6 | 600+ | | 6 | 600+ | |
| 7 | * | | 7 | * | |
| 8 | 500+ | | 8 | 500+ | |
| 9 | 200+ | | 9 | 200+ | |
| 10 | -400+ | | 10 | -400+ | |
| 11 | ◇/# | | 11 | ◇/# | ✓ |
| 12 | 700+ | | 12 | 720+ | ✓ |
| 13 | * | | 13 | * | |
| 14 | G* | | 14 | G* | ✓ |

(D)

| | BEFORE CORRECTION | | | AFTER CORRECTION | |
|---|---|---|---|---|---|
| No. | CALCULATION DATA | CORRECTION FLAG | No. | CALCULATION DATA | CORRECTION FLAG |
| 1 | [MC] | | 1 | [MC] | |
| 2 | [CA] | | 2 | [CA] | |
| 3 | 5[M+] | | 3 | 25[M+] | ✓ |
| 4 | 15[M+] | | 4 | 15[M+] | |
| 5 | [MR] | | 5 | [MR] | ✓ |
| 6 | [×] | | 6 | [×] | |
| 7 | 3[+=] | | 7 | 3[+=] | |
| 8 | 1[+] | | 8 | 1[+] | |
| 9 | 2[+] | | 9 | 2[+] | |
| 10 | 3[+] | | 10 | 3[+] | |
| 11 | [*] | | 11 | [*] | |
| 12 | 30[M+] | | 12 | 30[M+] | |
| 13 | [MR] | | 13 | [MR] | ✓ |

CALCULATION DATA PRINTING APPARATUS, CALCULATION DATA PRINTING METHOD AND COMPUTER-READABLE STORAGE MEDIUM

CROSS-REFERENCE TO RELATED APPLICATIONS

This application is based upon and claims the benefit of priority from prior Japanese Patent Application No. 2016-006639, filed Jan. 15, 2016, the entire contents of which are incorporated herein by reference.

FIELD

The present invention relaters to a calculation data printing apparatus, a calculation data printing method and a computer-readable storage medium.

BACKGROUND

Conventionally, there has been proposed a printer-equipped electronic calculator which can perform such a double-input check that a first input calculation formula was stored, and then the same calculation formula is input once again, thereby checking whether the first input formula is correct or not (for example, Jpn. Pat. Appln. KOKAI Publication No. H08-241285).

In the above printer-equipped electronic calculator, calculation data, which is involved in the first calculation, is not printed. At a time point when the second input of the calculation formula is finished, the series of calculation data is printed. Thereby, even if there is an input error in the first calculation, the correct input content can be printed after the confirmation of the second calculation, and useless printing can be prevented.

In general, a printer-equipped electronic calculator is advantageous in that, each time an operator and an operand of a calculation formula are input, these are successively printed as calculation data, and a calculation work can be performed while the series of input calculation formulae is being confirmed. However, this advantage cannot be obtained, if the calculation data involved in the first calculation is not printed as in the above-described conventional printer-equipped electronic calculator.

Specifically, useless printing cannot be prevented by the printing method of the above-described conventional printer-equipped electronic calculator, in the case of the checking method in which, each time calculation data is input, the input calculation data is confirmed by display or printing, unlike the double-input checking method in which whether an input calculation formula is correct or not is determined by inputting the same calculation formula once again.

The present invention has been made in consideration of the above-described problem, and the object of the invention is to provide a calculation data printing apparatus and a calculation data printing method, which makes it possible to prevent useless printing and to save printing, in a case where calculation data was input and printed and thereafter the input calculation data is corrected (changed).

SUMMARY

In general, according to one embodiment, a calculation data printing apparatus includes a printer and a processor. The processor is configured to execute processes of inputting a plurality of calculation data in accordance with a user operation; causing the printer to print, as first print data, the plurality of calculation data, and calculation result data of the plurality of calculation data; changing at least one of the plurality of calculation data in accordance with a user operation; and causing the printer to print, as second print data, at least one calculation data including the changed calculation data and calculation result data of the plurality of calculation data at least one of which is changed, without printing at least one of the plurality of calculation data printed as the first print data.

According to the calculation data printing apparatus, it is possible to prevent useless printing and to save printing, in a case where calculation data was input and printed and thereafter the input calculation data is corrected (changed).

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3 is a view illustrating the content of calculation data registered in a calculation data storage area 22f of the printer-equipped electronic calculator 10.

DETAILED DESCRIPTION

Embodiments of the invention will be described with reference to the accompanying drawings.

Figure 1:
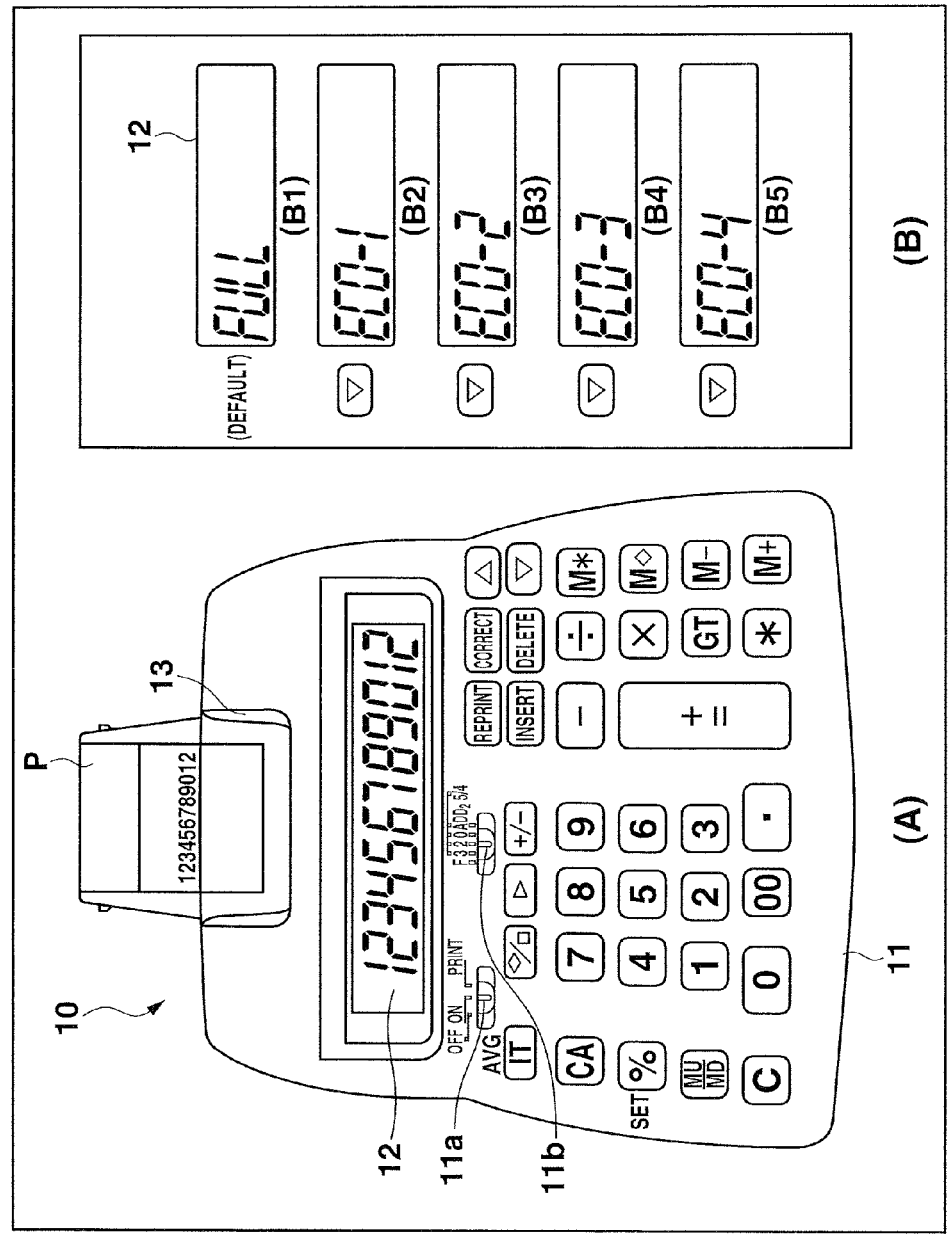
FIG. 1 is a front view illustrating a configuration of the external appearance of a printer-equipped electronic calculator 10 according to an embodiment of a calculation data printing apparatus of the present invention.

FIG. 1 is a front view illustrating a configuration of the external appearance of a printer-equipped electronic calculator 10 according to an embodiment of a calculation data printing apparatus of the present invention.

As illustrated in part (A) of FIG. 1, the printer-equipped electronic calculator 10 includes a key input unit 11 on a front side of a stationary-type body case which is disposed on the desk for an easy operation. The calculator 10 further includes a display unit 12 and a print unit 13 on the rear side of the key input unit 11.

The key input unit 11 includes keys for numerical value input ([0], [00], [1]~[9], [.]), keys for calculation function designation ([+=], [−], [x], [÷], [GT (grand total)], [* (total)], [%], [M* (memory recall clear)]~[M+(memory plus)], [MU (mark-up)/MD (mark-down)], [IT (item/average)]), a clear-all key [CA], a clear key [C], input calculation data call keys [Δ] [∇], a correction (change) instruction key [CORRECT], an insertion instruction key [INSERT], a deletion instruction key [DELETE], and a reprint instruction key [REPRINT].

In addition, the key input unit 11 includes a print mode switch 11a, and a round (round mode) switch 11b.

The print mode switch 11a includes switch positions of "OFF", "ON" and "PRINT". At the position of "OFF", a power-ON state is set. At the position of "ON", a power-ON state is set and a print-mode-OFF state is set. At the position of "PRINT", a power-ON state is set and a print-mode-ON state is set (a state in which respective calculation data relating to numerical values corresponding to a calculation operation, a calculation function, and a calculation result are all printed).

The round (round mode) switch is a switch for designating a rounding process as to how to calculate fractions below decimal point. The round (round mode) switch 11b includes switch positions of "F", "3, 2, 0−(5/4)", and "ADD2−(5/4)". At the position of "F" (floating-point calculation), a calculation result is obtained without processing a decimal fraction. At the position of "3, 2, 0−(5/4)", a last one digit of a designated number is calculated by "rounding-off". At the position of "ADD2−(5/4)" (second decimal place designation calculation), a decimal point is automatically input at last two digits of an entered number, even without pressing [.] at a time of performing addition/subtraction.

If the reprint instruction key [REPRINT] is pressed in the print-mode-OFF state, a series of calculation data, which was calculated immediately before the key operation, is recalculated from the beginning, and all calculation data are printed. If the reprint instruction key [REPRINT] is pressed in the print-mode-ON state, calculation data in a range including a part that changes by correction (change), among the series of calculation data which was corrected (changed) and recalculated immediately before the key operation, is reprinted with a range that was set in accordance with any one of ECO PRINT modes (see part (B) of FIG. 1) which will be described later.

In the following description, the term "reprint" includes reprinting of the same content after printing and printing of a corrected content after printing.

As illustrated in part (B) of FIG. 1, by the combinational operation of the [CA] key and [REPRINT] key of the key input unit 11, the ECO PRINT mode enters such a state that the ECO PRINT mode can be set while a setup screen displayed on the display unit 12 is being confirmed.

As illustrated in part (B1) of FIG. 1, the ECO PRINT mode is set to "FULL" as a default state. As illustrated in parts (B2) to (B5) of FIG. 1, each time the [∇] ([Δ (back)] key is input, the ECO PRINT mode is switched in the order of "ECO-1"→"ECO-2"→"ECO-3"→"ECO-4".

"FULL": Calculation data in the entire range including a part that changes by correction (change) is reprinted.

"ECO-1": Calculation data in a range from an unchanged part immediately before a first changed part by correction (change) to the last, and calculation result data, which changes by the correction (change), are reprinted.

"ECO-2": Calculation data in a range from an unchanged part immediately before a first changed part by correction (change) to an unchanged part immediately after a last changed part, and calculation result data, which changes by the correction (change), are reprinted.

"ECO-3": Calculation data in a range including a changed part by correction (change) and an unchanged part before and after this changed part, and calculation result data, which changes by the correction (change), are reprinted. If there are a plurality of such ranges, these ranges are reprinted together.

"ECO-4": Calculation data in a range of only a changed part by correction (change), and calculation result data, which changes by the correction (change), are reprinted. The display unit 12 includes a liquid crystal display panel which is composed of 12-digit segments. The display unit 12 displays an input calculation formula and calculation data of a calculation result at each time.

The print unit 13 includes, for example, a thermal-transfer printing mechanism. The print unit 13 prints and outputs the calculation data on recording paper P, based on the setup state of the print-mode-OFF/ON, the input state of the [REPRINT] key, and the setup state of the ECO PRINT mode.

Figure 2:
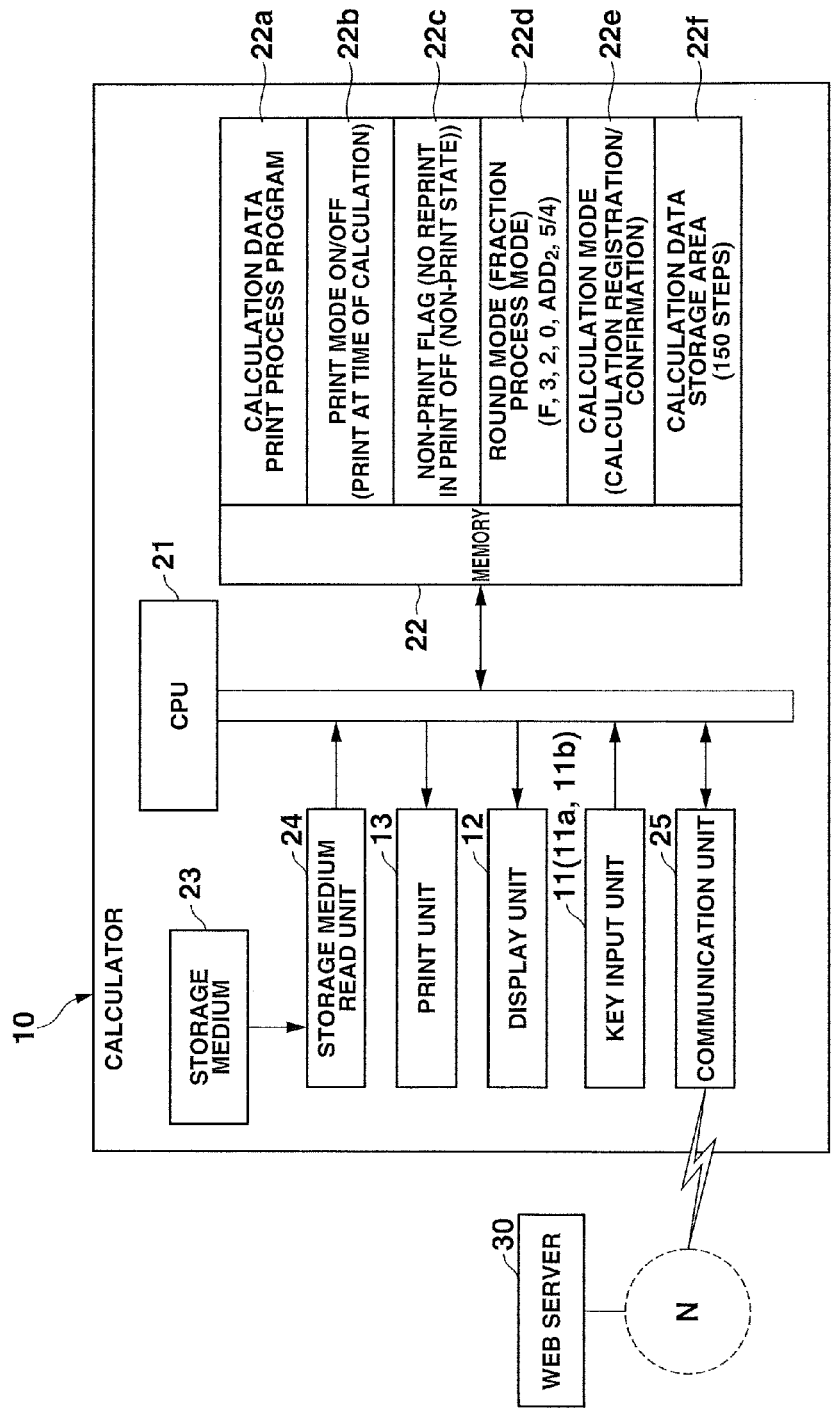
FIG. 2 is a block diagram illustrating a configuration of electronic circuitry of the printer-equipped electronic calculator 10.

FIG. 2 is a block diagram illustrating a configuration of electronic circuitry of the printer-equipped electronic calculator 10.

The electronic circuitry of the printer-equipped electronic calculator 10 includes a CPU (processor) 21 that is a computer. The CPU 11 controls the operations of the respective circuitry components in accordance with a calculator control program which is stored in a memory 22, and executes various calculation functions and a calculation data printing function in accordance with a user operation of the key input unit 11.

The key input unit 11, the display unit 12, the print unit 13, the memory 22, and a storage medium read unit 24 are connected to the CPU (processor) 21. In addition, a communication unit 25, which executes communication with an external device (30), is connected to the CPU (processor) 21.

The calculator control program is prestored in the memory 22, or is read from an external storage medium 32, such as a memory card, by the storage medium read unit 24 and stored in the memory 22, or is downloaded from a Web server (program server) 30 on a communication network N via the communication unit 25 and stored in the memory 22.

The computer control program includes various calculation process programs corresponding to user operations, and also includes a calculation data print process program 22a for printing calculation data of a calculation process which is executed in accordance with the calculation process programs.

In addition, in the memory 22, a PRINT mode storage area 22b, a non-print flag storage area 22c, a round mode (fraction process mode) storage area 22d, a calculation mode storage area 22e and a calculation data storage area 22f are secured.

The PRINT mode storage area 22b stores setup data of the print mode OFF when the print mode switch 11a is at the position of "ON", and stores setup data of the print mode ON when the print mode switch 11a is at the position of "PRINT".

The non-print flag storage area 22c stores data of non-print flag ON in the state of the PRINT mode OFF, in association with a series of calculation data in a calculation process corresponding to a user operation.

The round mode (fraction process mode) storage area 22d stores setup data of any one of the "F" (floating-point calculation), "3, 2, 0–(5/4)" (rounding-off), and "ADD2–(5/4)" (second decimal place designation calculation), which was designated in accordance with the position of the round (round mode) switch 11b.

The calculation mode storage area 22e stores either setup data of a calculation registration mode of successively registering, as journal data, calculation data of a calculation formula, which is composed of a numerical value and a calculation function that are input in accordance with a user operation, or setup data of a calculation confirmation (check) mode of calling and displaying the calculation data, which was registered in this calculation registration mode, in accordance with an input of the call key [Δ] [∇].

The calculation data storage area 22f successively stores and registers, as journal data, a series of calculation data which was input in accordance with a user operation in the calculation registration mode.

FIG. 3 is a view illustrating the content of calculation data registered in the calculation data storage area 22f of the printer-equipped electronic calculator 10.

Each time each key for the calculation function designation is input, calculation data of an input numerical value and calculation function is successively input.

Parts (A) and (B) of FIG. 3 illustrate concrete examples of calculation data in a case in which addition/subtraction/multiplication/division operations were performed. Part (C) of FIG. 3 illustrates a concrete example of calculation data in a case in which a grand total was calculated from a plurality of addition/subtraction/multiplication/division operations. Part (D) of FIG. 3 illustrates a concrete example of calculation data in a case in which a calculation was performed by making use of a memory calculation function.

A case is now considered in which calculation data was corrected (changed) in the correction (change) process of the calculation data corresponding to the input of the correction (change) key [CORRECT]. At this time, in the case of the addition/subtraction/multiplication/division operations (four operations), correction (change) flags are added to the calculation data of a corrected (changed) part and to calculation result data which changes by the correction (change) of the total [*} and grand total [G*], which are positioned after the corrected (changed) part. In the case of a calculation utilizing the memory calculation function, correction (change) flags are added to the calculation data of a corrected (changed) part and to calculation data of the memory recall [MR] which is positioned after the corrected (changed) part.

In the printer-equipped electronic calculator 10 with the above-described configuration, the CPU 21 controls the operations of the respective circuitry components in accordance with the instructions described in the calculator control program (including the calculation data print process program 22a). In addition, the software and hardware cooperatively operate to realize various calculation functions and a print function of calculation data, which will be described in the following description of the operations.

Next, the operation of the printer-equipped electronic calculator 10 with the above-described configuration is described.

Figure 4A:
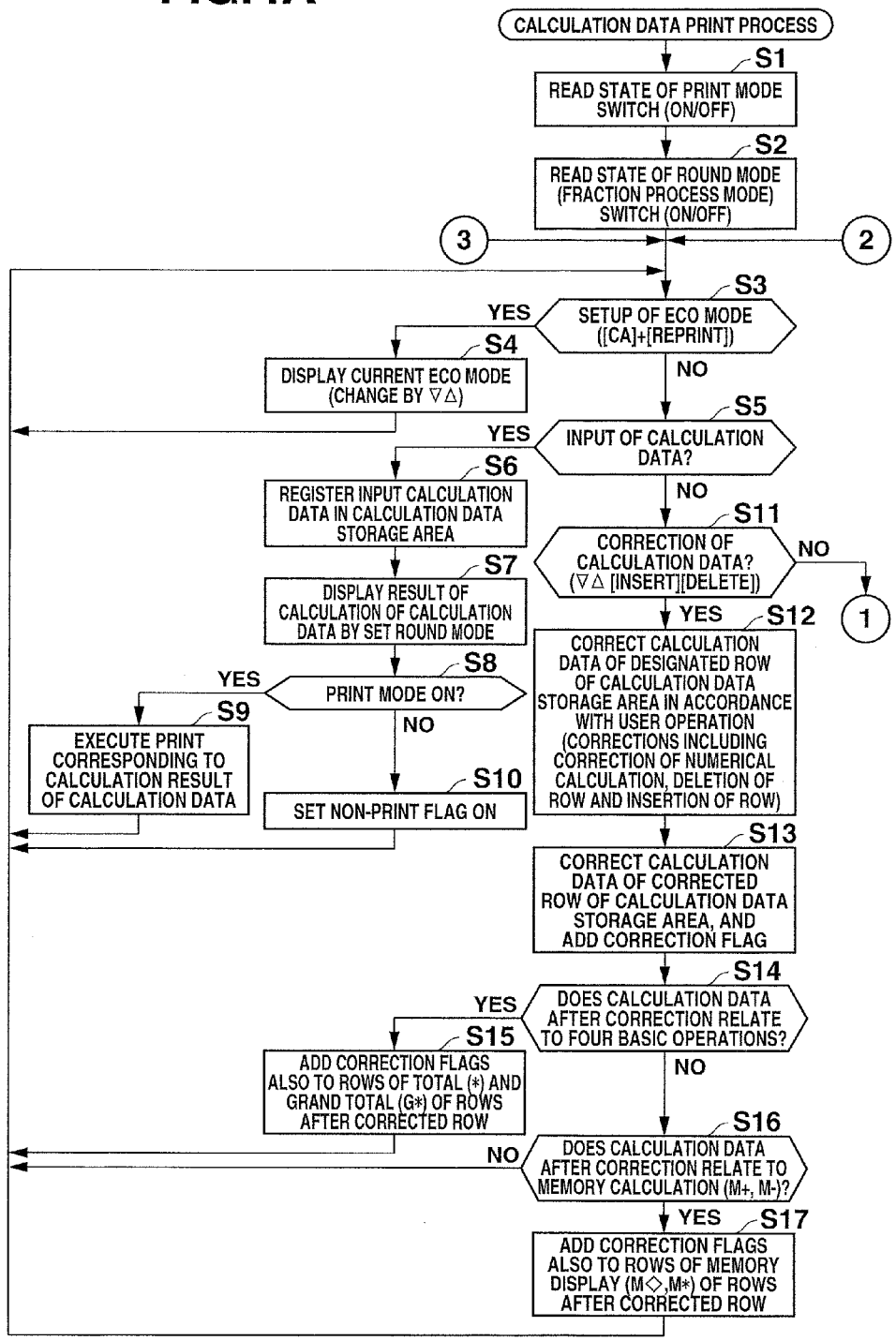
FIG. 4A is a flowchart illustrating a calculation data print process (part 1) of the printer-equipped electronic calculator 10.
Figure 4B:
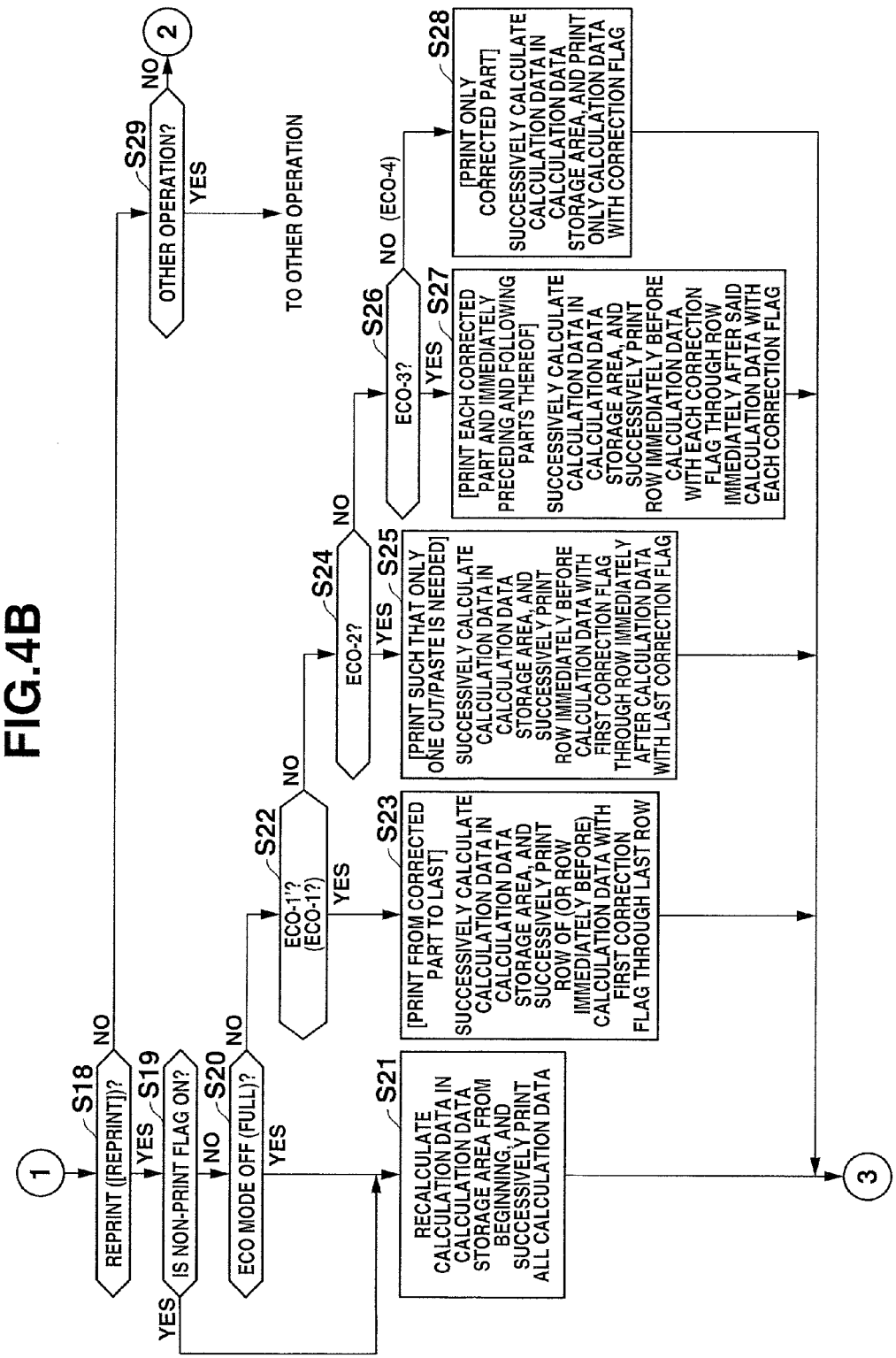
FIG. 4B is a flowchart illustrating the calculation data print process (part 2).

FIG. 4A and FIG. 4B are flowcharts illustrating a calculation data print process (part 1 and part 2) of the printer-equipped electronic calculator 10.

The print mode switch 11a is changed over from the position of "OFF" to the position of "ON" or "PRINT".

Thereby, the electronic calculator 10 is powered on. If the execution of the calculation data print process program 22a is started by the CPU 21, the state of the print mode switch 11a is read by the CPU 21, and the setup data of the print mode OFF or print mode ON is stored in the PRINT mode storage area 22b (step S1).

In addition, the state of the round (round mode) switch 11b is read by the CPU 21, and the setup data of any one of the "F" (floating-point calculation), "3, 2, 0–(5/4)" (rounding-off) and "ADD2–(5/4)" (second decimal place designation calculation) is stored in the round mode (fraction process mode) storage area 22d (step S2).

If the [CA] key and [REPRINT] key are input in combination (simultaneously operated), a transition occurs to the state in which the ECO PRINT mode is settable (step S3 (Yes)), the current ECO PRINT mode is changed and set, as illustrated in part (B) of FIG. 1, to any one of the "FULL", "ECO-1", "ECO-2", "ECO-3" and "ECO-4", and the changed ECO PRINT mode is displayed on the display unit 12 (step S4).

In each of Examples to be described below, descriptions will be given of operations in the state in which the print mode switch 11a is at the position of "PRINT" and thus the setup data of the print mode ON is stored.

Example 1

Figure 5:
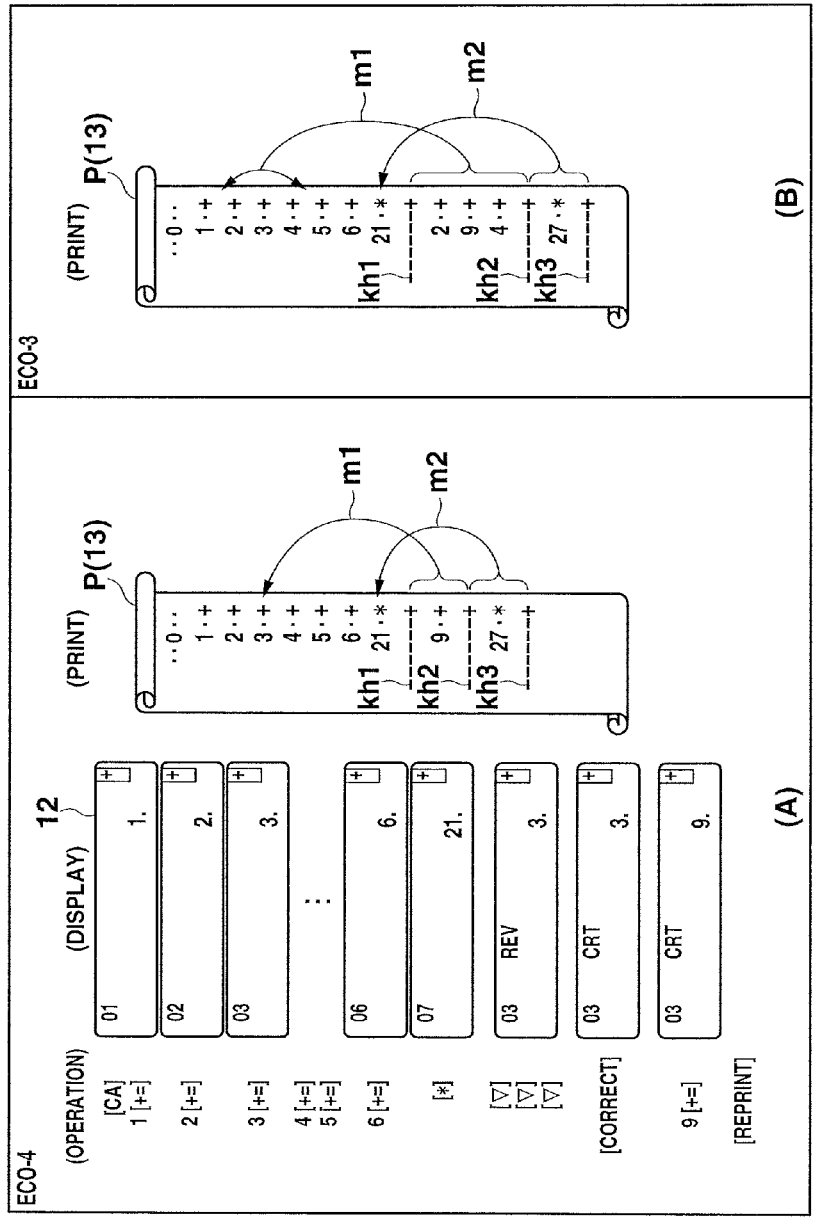
FIG. 5 is a view illustrating a display/print operation (Example 1) corresponding to a user operation of the printer-equipped electronic calculator 10.

FIG. 5 is a view illustrating a display/print operation (Example 1) corresponding to a user operation of the printer-equipped electronic calculator 10. Part (A) of FIG. 5 is a view illustrating a case of the ECO PRINT mode "ECO-4". Part (B) of FIG. 5 is a view illustrating a case of the ECO PRINT mode "ECO-3".

As illustrated in part (A) of FIG. 5, in accordance with user operations of the key input unit 11, the clear-all key [CA] is input, and thereafter "1" [+=], "2" [+=], . . . , "6" [+=], and [*] are input. Thus, as illustrated in part (A) of FIG. 3, each time the [+=] is input, the input calculation data is stored in the calculation data storage area 22f. Then, a calculation corresponding to the setup data of the round mode is executed, and the calculation data of the calculation result is displayed as "21" on the display unit 12 (steps S5 to S7).

At this time, the setup data of the print mode ON is stored in the PRINT mode storage area 22b. Thus, each time the [CA] key and [+=] key are input, " . . . 0.0 . . . ", "1.+", 2.+", . . . , "6.+" are successively printed on the recording paper P by the print unit 13 (step S8 (Yes)→S9).

Here, if the total key [*] is input, calculation result data "21" of the totalizing calculation of the series of calculation data is displayed on the display unit 12 (steps S5 to S7).

Then, "21.*" is printed on the recording paper P by the print unit 13 (step S8 (Yes)→S9).

In the display of the input/registration/calculation/calculation result of the calculation data according to steps S5 to S7, if the setup data of the print mode OFF is stored in the PRINT mode storage area 22b (step S9 (No)), the data of the non-print flag ON is stored in the non-print flag storage area 22c.

Here, the series of calculation data "1.+" to "6.+" and calculation result data "21.+", which are printed on the recording paper P, are confirmed, and, in order to correct (change) the third calculation data "3.+" to "9.+", the call key [∇] of the input calculation data is input three times. Then, of the series of calculation data stored in the calculation data storage area 22f, the calculation data (input data)

"3.+" of a third row "03" is called, and is displayed together with a check symbol "REV" on the display unit 12.

In order to correct (change) the calculation data (input data) "3.+" of the third row "03" which is displayed on the display unit 12, if the correction (change) key [CORRECT] is input and the corrected (changed) calculation data is input as "9" [+=], the corrected (changed) calculation data "9.+" is displayed together with a correction (change) symbol "CRT" on the display unit 12 (step S11 (Yes)→S12).

Then, of the series of calculation data stored in the calculation data storage area 22f (see part (A) of FIG. 3), the calculation data of the corrected (changed) third row "03" is corrected (changed) to "9.+", and a correction (change) flag is added (step S13).

Subsequently, if the corrected (changed) calculation data is determined to be the addition/subtraction/multiplication/division (four operations) (step S14 (Yes)), a correction (change) flag is also added to the calculation data of the total [*] which is positioned after the corrected (changed) third row, among the series of calculation data stored in the calculation data storage area 22f. At this time, a correction (change) flag may also be added to the calculation data of the total [*] only when the value of the calculation result of the totalizing calculation of the total changes (step S15).

If the [REPRINT] key is input in order to reprint the corrected (changed) calculation data (step S18 (Yes)), reprint corresponding to the setup state of the ECO PRINT mode is executed when the non-print flag OFF is currently set (step S19 (No)) (steps S20-S28).

In the meantime, if the non-print flag ON is currently set (step S19 (Yes)) or if the ECO PRINT mode "FULL" is set even when the non-print flag OFF is set (step S20 (Yes)), the series of calculation data "1+", . . . , "9+", . . . , "6+" and "*" after the correction (change), which is stored in the calculation data storage area 22f (see part (A) of FIG. 3), is recalculated from the first row, and each calculation data by the recalculation is successively printed and output to the recording paper P by the print unit 13 (step S21).

As illustrated in part (A) of FIG. 5, when the [REPRINT] key was input after the correction (change) of the calculation data (step S18 (Yes)), if it is determined that the non-print flag OFF and the ECO PRINT mode "ECO-4" are set (step S26 (No)), the series of calculation data "1+" . . . , "9+", . . . , "6+" and "*" after the correction (change), which is stored in the calculation data storage area 22f (see part (A) of FIG. 3), is recalculated, and only the ranges of calculation data with flags after the correction (change) are printed on the recording paper P as "9.+" and "27. *", with cut/paste marks kh1 to kh3 being added to before and after each calculation data (step S28).

Thereby, the user can cut off only the calculation data "9.+" and "27. *" of the rows, which were changed after the correction (change) and were printed on the recording paper P, from the cut/paste marks kh1 to kh3. Then, as indicated by arrows m1 and m2, the user can overlappingly paste the cut-off calculation data onto the corresponding parts of the calculation data "3.+" and "21.*" that was printed before the correction (change). Thereby, even without reprinting all the series of calculation data after the correction (change), the user can obtain the recording paper P on which the same series of calculation data is printed, and can save printing by preventing useless printing.

Next, in the same manner as in the case illustrated in part (A) of FIG. 5, when the [REPRINT] key was input after the correction (change) of the calculation data (step S18 (Yes)), if it is determined that the non-print flag OFF and the ECO PRINT mode "ECO-3" are set as illustrated in part (B) of FIG. 5 (step S26 (Yes)), the series of calculation data "1+", . . . , "9+", . . . , "6+" and "*" after the correction (change), which is stored in the calculation data storage area 22f (see part (A) of FIG. 3), is recalculated, and only the range of calculation data from the row immediately before the calculation data with the correction (change) flag to the row immediately after the calculation data with the correction (change) flag is printed on the recording paper P as "2.+", "9.+" and "4.+", and "27.*" (the calculation result data of total [*] is only one row), with cut/paste marks kh1 to kh3 being added to before and after each calculation data (step S27).

Thereby, the user can cut off only the calculation data of the range ("2.+"~"4.+", and "27.*") including the row that was changed after the correction (change) and the unchanged rows immediately before and after the changed row, which were printed on the recording paper P, from the cut/paste marks kh1 to kh3. Then, as indicated by arrows m1 and m2, the user can overlappingly paste the cut-off calculation data onto the corresponding range of the calculation data that was printed before the correction (change). Thereby, in the same manner as described above, even without reprinting all the series of calculation data after the correction (change), the user can obtain the recording paper P on which the same series of calculation data is printed, and can save printing by preventing useless printing.

At this time, by reprinting the range including the calculation data of the row changed after the correction (change) and the calculation data of the unchanged rows immediately before and after the changed row, the user can easily find out the range of the corresponding calculation data printed before the correction (change), and can easily paste the reprinted range on the found-out range.

Example 2

Figure 6:
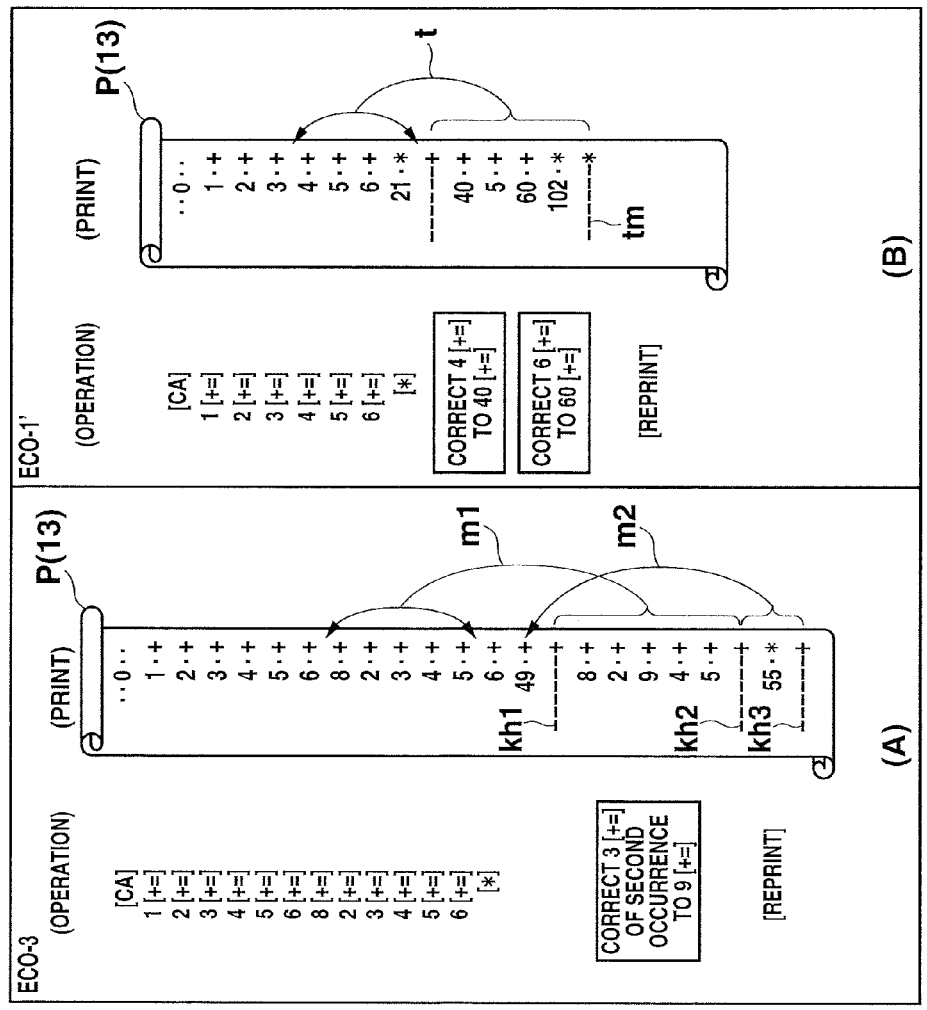
FIG. 6 is a view illustrating a print operation (Example 2) corresponding to a user operation of the printer-equipped electronic calculator 10.

FIG. 6 is a view illustrating a print operation (Example 2) corresponding to a user operation of the printer-equipped electronic calculator 10. Part (A) of FIG. 6 is a view illustrating a case of the ECO PRINT mode "ECO-3". Part (B) of FIG. 6 is a view illustrating a case of "ECO-1°" (modification of ECO-1)".

As illustrated in part (A) of FIG. 6, if calculation data [CA], "1" [+=], "2" [+=], . . . , "6" [+=], in which addition of "2"~"6" is included twice, is input in accordance with a user operation of the key input unit 11, the input calculation data is stored in the calculation data storage area 22f in the same manner as described above, the calculation corresponding to the setup data of the round mode is executed, and the result is successively displayed on the display unit 12 (steps S5 to S7).

In the same manner as described above, each time the [CA] key and [+=] key are input, calculation data " . . . 0 . . . ", "1.+", 2.+", . . . , "6.+" are successively printed on the recording paper P by the print unit 13 (step S8 (Yes)→S9).

In addition, if the total key [*] is input, calculation result data "49" of the totalizing calculation is displayed on the display unit 12 (steps S5 to S7), and "49.*" is printed on the recording paper P by the print unit 13 (step S8 (Yes)→S9).

Here, "3" [+=] of the second occurrence in the series of calculation data of "1" [+=], . . . , "6" [+=] is called by repeatedly inputting the call key [V] of the input calculation data. If "3" [+=] is corrected (changed) by inputting the correction (change) key [CORRECT] and "9" [+=] (step S11, S12), "3.+" of the second occurrence in the series of calculation data stored in the calculation data storage area 22*f* is corrected (changed) to "9.+", and a correction (change) flag is added (step S13).

The corrected (changed) calculation data is determined to be the addition/subtraction/multiplication/division (four operations) (step S14 (Yes)), and a correction (change) flag is also added to the calculation result data of the total [*] which is positioned after the row of the corrected (changed) calculation data "9.+" in the series of calculation data stored in the calculation data storage area 22*f*. At this time, a correction (change) flag may also be added to the calculation result data of the total [*] only when the value of the calculation result data of the totalizing calculation of the total changes (step S15).

Thereafter, if the [REPRINT] key is input (step S18 (Yes)), it is determined that the non-print flag OFF and the ECO PRINT mode "ECO-3" are set (step 26 (Yes)).

Then, the series of calculation data after the correction (change), which is stored in the calculation data storage area 22*f*, is successively calculated. Of these calculated data, only the range of calculation data from the calculation data of the row immediately before the calculation data "9.+" with the correction (change) flag to the calculation data of the row immediately after the calculation data "9.+" with the correction (change) flag (the range, which includes two rows before and two rows after the calculation data with the correction (change) flag, is chosen if a plurality of similar parts exist in the calculation data before the correction (change) in the range including one row immediately before and one row immediately after the calculation data with the correction (change) flag), i.e. "8.+", "2.+", "9.+", "4.+" and "5.+", and the calculation result data "55*" of the totalizing calculation, are printed on the recording paper P, with cut/paste marks kh1 to kh3 being added to before and after each calculation data (step S27).

Thereby, the user can cut off only the calculation data ("8.+" "5.+") in the range including the row changed after the correction (change) and the unchanged rows immediately before and after this row, and the calculation result data ("55."), which were printed on the recording paper P, from the cut/paste marks kh1 to kh3. Then, as indicated by arrows m1 and m2, the user can overlappingly paste the cut-off calculation data onto the range of the corresponding calculation data that was printed before the correction (change). Thereby, in the same manner as described above, even without reprinting all the series of calculation data after the correction (change), the user can obtain the recording paper P on which the same series of calculation data is printed, and can save printing by preventing useless printing.

In addition, in the same manner as described above, by reprinting the range including the calculation data of the row changed after the correction (change) and the calculation data of the unchanged rows immediately before and after the changed row, the user can easily find out the range of the corresponding calculation data printed before the correction (change), and can easily paste the reprinted range on the found-out range.

Next, as illustrated in part (B) of FIG. 6, if a calculation of adding "1"~"6" is performed (see part (B) of FIG. 3), the input calculation data and the calculation result data of the totalizing calculation are printed on the recording paper P as " . . . 0 . . . ", "1.+", 2.+", . . . , "6.+" and "21.*" in the same manner as described above (steps S5 to S9).

Here, in the same manner as described above, the call key [V] of the input calculation data is input, and "4" [+=] is called and corrected (changed) by inputting the correction (change) key [CORRECT] and "40" [+=]. Furthermore, likewise, "6" [+=] is called and corrected (changed) by inputting the correction (change) key [CORRECT] and "60" [+=]. Then, of the series of calculation data stored in the calculation data storage area 22*f* (see part (B) of FIG. 3), "4.+" is corrected (changed) to "40.+", and "6.+" is corrected (changed) to "60.+", and correction (change) flags are added (steps S11 to S13).

Then, the corrected (changed) calculation data is determined to be the addition/subtraction/multiplication/division (four operations) (step S14 (Yes)), and a correction (change) flag is also added to the calculation data of the total [*] which is positioned after the rows of the corrected (changed) calculation data "40.+" and "60.+" in the series of calculation data stored in the calculation data storage area 22*f*. At this time, a correction (change) flag may also be added to the calculation result data of the total [*] only when the value of the calculation result data of the totalizing calculation of the total changes (step S15).

Thereafter, if the [REPRINT] key is input (step S18 (Yes)), it is determined that the non-print flag OFF and the ECO PRINT mode "ECO-1°" (modification of ECO-1)" are set (step 22 (Yes)).

Then, the series of calculation data after the correction (change), which is stored in the calculation data storage area 22*f*, is successively calculated. Of these calculated data, the range from the calculation data of the row of calculation data "40.+" with the first correction (change) flag to the calculation data of the last row, i.e. the range of "40.+", "5.+", "60.+" and "102.*", is printed on the recording paper P, with a terminal end overlap mark tm being added to the terminal end (step S23).

Thereby, the user can fold and overlappingly paste the calculation data in the range from the first row changed after the correction (change) to the last row of the calculation result, including the intervening changed row, which were printed on the recording paper P, onto the range of the corresponding calculation data printed before the correction (change), as indicated by an arrow t with attention being paid to the terminal end overlap mark tm. Thereby, in the same manner as described above, even without reprinting all the series of calculation data after the correction (change), the user can obtain the recording paper P on which the same series of calculation data is printed, and can save printing by preventing useless printing.

Example 3

Figure 7:
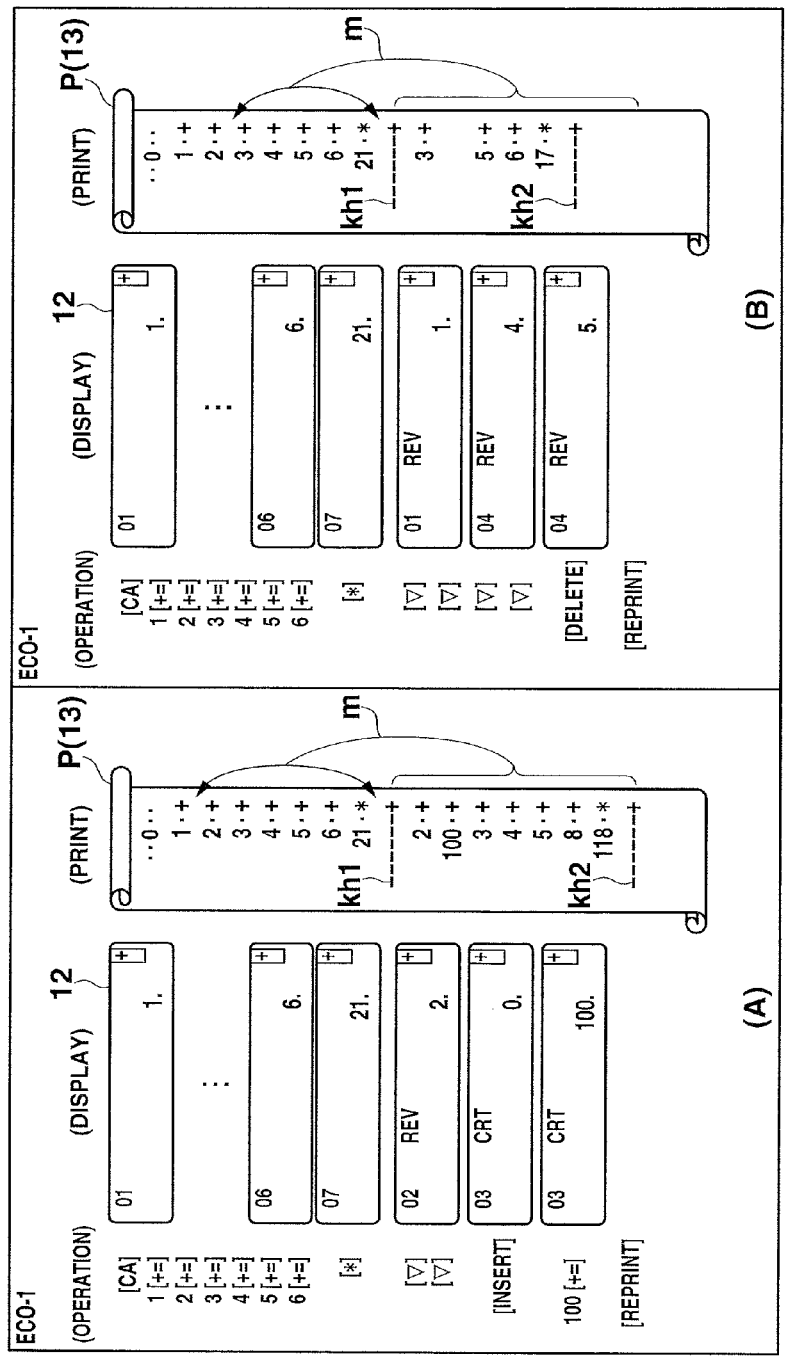
FIG. 7 is a view illustrating a print operation (Example 3) corresponding to a user operation of the printer-equipped electronic calculator 10.

FIG. 7 is a view illustrating a print operation (Example 3) corresponding to a user operation of the printer-equipped electronic calculator 10. Part (A) of FIG. 7 is a view illustrating a case of calculation data insertion in the ECO PRINT mode "ECO-1". Part (B) of FIG. 7 is a view illustrating a case of calculation data deletion in "ECO-1".

As illustrated in part (A) of FIG. 7, if a calculation of adding "1"~"6" is performed, the input calculation data and the calculation result data of the totalizing calculation are printed on the recording paper P as " . . . 0 . . . ", "1.+", 2.+", . . . , "6.+" and "21.*" in the same manner as described above (steps S5 to S9).

Here, in the same manner as described above, the call key [V] of the input calculation data is input, and calculation data "2" [+=] of the second row is called, and the insertion instruction key [INSERT] and "100" [+=] are input. Thereby, calculation data is inserted in the third row, and correction (change) is made. Then, of the series of calculation data stored in the calculation data storage area 22*f*, "100.+" is inserted in the third row and correction (change) is made, and a correction (change) flag is added (steps S11 to S13).

Then, the corrected (changed) calculation data is determined to be the addition/subtraction/multiplication/division (four operations) (step S14 (Yes)), and a correction (change) flag is also added to the calculation data of the total [*] which is positioned after the row of the corrected (changed) calculation data "100.+" in the series of calculation data stored in the calculation data storage area 22f. At this time, a correction (change) flag may also be added to the calculation data of the total [*] only when the value of the calculation result of the totalizing calculation of the total changes (step S15).

Thereafter, if the [REPRINT] key is input (step S18 (Yes)), it is determined that the non-print flag OFF and the ECO PRINT mode "ECO-1" are set (step 22 (Yes)).

Then, the series of calculation data after the correction (change), which is stored in the calculation data storage area 22f, is successively calculated. Of these calculated data, the range from the calculation data "2.+" of the row, which is immediately before the calculation data "100.+" with the first correction (change) flag to the calculation data of the last row and the calculation result data, i.e. the range of "2.+", "100.+", "3.+"~ and "118.*", is printed on the recording paper P, with cut/paste marks kh1 and kh2 being added to before and after this range (step S23).

Thereby, the user can cut off the calculation data and calculation result data in the range from the row immediately before the first changed row after the correction (change) to the last row of the calculation result, which were printed on the recording paper P, from the cut/paste marks kh1 and kh2. Then, as indicated by an arrow m, the user can overlappingly paste the cut-off calculation data onto the range of the corresponding calculation data that was printed before the correction (change). Thereby, in the same manner as described above, even without reprinting all the series of calculation data after the correction (change), the user can obtain the recording paper P on which the same series of calculation data is printed, and can save printing by preventing useless printing.

Part (B) of FIG. 7 illustrates an operation in a case in which, after a calculation of addition of "1"~"6" was executed in the same manner as in part (A) of FIG. 7 (steps S5 to S9), calculation data "4" [+=] of the fourth row was called and this calculation data of the fourth row was deleted and corrected (changed) by the deletion instruction key [DELETE] (steps S11 to S15).

In this case, although the calculation data "4" [+=] of the fourth row, which is stored in the calculation data storage area 22f, was deleted, the calculation data of the fourth row is changed to a blank with no data, and a correction (change) flag is added in the same manner as described above. In addition, a correction (change) flag is also added to the calculation result data of the total [*] which is positioned after the corrected (changed) fourth row.

Here, since the ECO PRINT mode "ECO-1" is set in the same manner as described above, if the [REPRINT] key is input (step S18 (Yes)), the series of calculation data after the correction (change), which is stored in the calculation data storage area 22f, is successively calculated. Of these calculated data, the range from the calculation data "3.+" of the row, which is immediately before the calculation data "(blank)" with the first correction (change) flag to the calculation data of the last row, i.e. the range of "3.+", "(blank)", 5.+"~"17.*", is printed on the recording paper P, with cut/paste marks kh1 and kh2 being added to before and after this range (step S21 (Yes), S23).

Thereby, in the same manner as above, even without reprinting all the series of calculation data after the correction (change), the user can obtain the recording paper P on which the same series of calculation data is printed, and can save printing. Moreover, by changing the row of the deleted and corrected (changed) calculation data to the blank, the user can overlappingly paste, without positional displacement, the reprinted calculation data after the correction (change) and the changed calculation result data onto the corresponding range of calculation data printed before the correction (change).

In the meantime, in the ECO PRINT mode "ECO-1" (or ECO-1'), of the series of calculation data calculated before the correction (change), the range from the calculation data of the row immediately before the calculation data with the first correction (change) flag (or the row with the first correction (change) flag) to the last calculation data is successively printed. On the other hand, in the ECO PRINT mode "ECO-2", the range from the calculation data of the row immediately before the recalculated data with the first correction (change) flag to the calculation data of the row immediately after the calculation data with the last correction (change) flag is successively printed (step S24 (Yes), S25).

In this ECO PRINT mode "ECO-2", in the same manner as above, even without reprinting all the series of calculation data after the correction (change), the user can obtain the recording paper P on which the same series of calculation data is printed, and can save printing.

Example 4

Figure 8:
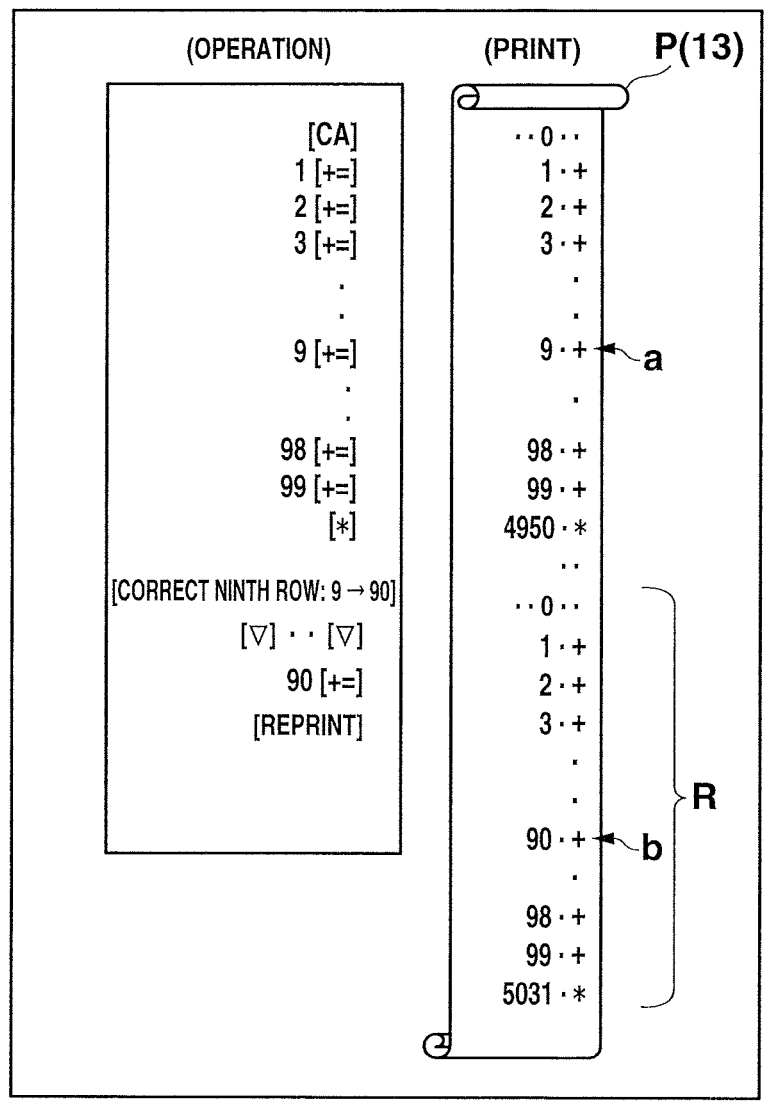
FIG. 8 is a view illustrating a print operation (Example 4) corresponding to a user operation of the printer-equipped electronic calculator 10.

FIG. 8 is a view illustrating a print operation (Example 4) corresponding to a user operation of the printer-equipped electronic calculator 10.

Example 4 shown in FIG. 8 illustrates an operation in a case in which, after a calculation of addition of "1"~"99" and printing were executed (steps S5 to S9), calculation data "9" [+=] (arrow a) of the ninth row was called and this calculation data of the ninth row was corrected (changed) to "90" [+=] (arrow b) (steps S11 to S15).

In this case, a long-range calculation of a predetermined number of steps (e.g. 50 steps) or more is executed and calculation data is printed. When calculation data of an arbitrary row was corrected (changed), if the corrected (changed) row is located at a position close to the beginning of the entire calculation data, such as a position within 10% from the beginning of the entire calculation data, such a configuration may be adopted that the entire range R from the beginning to the end of the calculation data is reprinted with importance being placed on work efficiency, for example, even if the above-described ECO PRINT mode "ECO-1" is set.

In the meantime, although not illustrated in each of the Examples, as illustrated in part (C) of FIG. 3, when calculation data of an arbitrary row (12th row in part (C) of FIG. 3) in a series of calculation data including a grand total [G*] was corrected (changed) ("700+" "720+"), a correction (change) flag is added to the calculation data "720+" of the corrected (changed) row (12th row) stored in the calculation data storage area 22f. In addition, correction (change) flags are also added to the calculation result data of the total [*] and grand total [G*] which are positioned after the corrected (changed) row. At this time, a correction (change) flag may also be added to the calculation data of the total [*] only when the value of the calculation result of the totalizing calculation of the total changes (steps S11 to S15).

Besides, as illustrated in part (D) of FIG. 3, also when calculation data of an arbitrary row (third row in part (D) of FIG. 3) in a series of calculation data including a memory calculation [M+] ([M−]) was corrected (changed) ("5 [M+]"→"25 [M+]"), a correction (change) flag is added to the calculation data "25 [M+]" of the corrected (changed) row (third row) stored in the calculation data storage area 22f. In addition, a correction (change) flag is also added to the calculation data of the memory recall [MR] (memory recall/memory recall clear) which is positioned after the corrected (changed) row (third row) (steps S11 to S13, S16 and S17).

Thereby, in each of the case in which calculation data of an arbitrary row in the series of calculation data including the grand total [G*] was corrected (changed) and the case in which calculation data of an arbitrary row in the series of calculation data including the memory calculation [M+] ([M−]) was corrected (changed), the calculation data after the correction (change) is reprinted in accordance with the setup of the ECO PRINT modes "ECO-1" to "ECO-4" in the same manner as in the above-described Examples (steps S18 to S28). Thereby, even without reprinting all the series of calculation data after the correction (change), it is possible to obtain the recording paper P on which the same series of calculation data is printed, and to save printing by preventing useless printing.

Thus, according to the calculation data print function of the printer-equipped electronic calculator 10 with the above-described configuration, if calculation data, which is composed of a numerical value and a calculation function, is input in accordance with a user operation, the calculation data is stored, each time the calculation data is input, in the calculation data storage area 22f in the order of input. A calculation corresponding to the calculation data is executed, and the series of calculation data including the calculated result of the executed calculations is successively printed on the recording paper P by the print unit 13. Then, if any one of the series of calculation data stored in the calculation data storage area 22f is corrected (changed), correction (change) flags are added to the corrected (changed) calculation data, and to changed calculation data among the calculation data which are positioned after this corrected (changed) calculation data.

It is assumed that after the correction (change) of the calculation data, the [REPRINT] key was input. At this time, in the case of the setup of the ECO PRINT mode "ECO-1", of the series of calculation data after the correction (change), the range from the calculation data immediately before the calculation data with the first correction (change) flag to the last calculation data is successively reprinted. By laying the reprinted calculation data over the corresponding range of calculation data printed before the correction (change), it is possible to obtain the recording paper P on which the entire calculation data after the correction (change) is printed.

Additionally, in the case of the setup of the ECO PRINT mode "ECO-2", the range from the calculation data immediately before the calculation data with the first correction (change) flag to the calculation data immediately after the calculation data with the last correction (change) flag is reprinted. By laying the reprinted calculation data over the corresponding range of calculation data printed before the correction (change), it is possible to obtain the recording paper P on which the entire calculation data after the correction (change) is printed.

Additionally, in the case of the setup of the ECO PRINT mode "ECO-3", each range from the calculation data immediately before the calculation data with the correction (change) flag to the calculation data immediately after the calculation data with the correction (change) flag is reprinted. By laying each reprinted calculation data over each corresponding range of calculation data printed before the correction (change), it is possible to obtain the recording paper P on which the entire calculation data after the correction (change) is printed.

Additionally, in the case of the setup of the ECO PRINT mode "ECO-4", only the calculation data with each correction (change) flag is reprinted. By laying each reprinted calculation data over each corresponding part of the calculation data printed before the correction (change), it is possible to obtain the recording paper P on which the entire calculation data after the correction (change) is printed.

Thereby, needless to say, in any of the setup states of the ECO PRINT modes "ECO-1" to "ECO-4", there is no need to print the entire calculation data after the correction (change), and printing can be saved. Moreover, the user can selectively set any one of the ECO PRINT mode "ECO-1" with priority on work efficiency through the ECO PRINT mode "ECO-4" with priority on saving.

In the meantime, the methods of the respective processes by the printer-equipped electronic calculator 10, which has been described in each of the embodiments, that is, the respective methods of the calculation data print process, etc. illustrated in the flowcharts of FIG. 4A and FIG. 4B, can all be stored as computer-executable programs in a medium of an external storage device, such as a memory card (ROM card, RAM card, etc.), a magnetic disk (floppy (trademark) disk, hard disk, etc.), an optical disc (CD-ROM, DVD, etc.), or a semiconductor memory, and can be distributed. In addition, the computer (CPU) of the electronic calculator including the print function reads the program, which is stored in the medium of the external storage device, into the storage device, and the operation is controlled by this read-in program. Thereby, it is possible to realize the calculation data print function, which has been described in each of the embodiments, and to execute the same processes by the above-described methods.

In addition, the data of the program for realizing each of the above-described methods can be transmitted on a communication network (N) in the form of a program code, and the data of the program can be taken in the electronic calculator including the print function from a computer apparatus (program server) connected to this communication network (N), and stored in the storage device, thereby realizing the above-described calculation data print function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A calculation data printing apparatus comprising a printer and a processor, the processor being configured to execute processes of:
   inputting a plurality of calculation data in accordance with a user operation;
   causing the printer to print, as first print data, the plurality of calculation data, and calculation result data of the plurality of calculation data;
   changing at least one of the plurality of calculation data in accordance with a user operation; and causing the printer to print, as second print data, at least one calculation data including the changed calculation data and calculation result data of the plurality of calculation data at least one of which is changed, without printing at least one of the plurality of calculation data printed as the first print data.

2. The calculation data printing apparatus of claim 1, wherein the process of causing the printer to print the second print data includes a first print process of printing, as the second print data, the changed calculation data, and calculation result data of the plurality of calculation data at least one of which is changed.

3. The calculation data printing apparatus of claim 2, wherein the process of causing the printer to print the second print data includes a second print process of printing, among the plurality of calculation data printed as the first print data, calculation data before the changed calculation data to calculation data after the changed calculation data, as the second print data.

4. The calculation data printing apparatus of claim 3, wherein the process of causing the printer to print the second print data includes a third print process of printing, among the plurality of calculation data at least one of which is changed, the changed calculation data and calculation data following the changed calculation data, as the second print data.

5. The calculation data printing apparatus of claim 4, wherein the process of causing the printer to print the second print data includes a fourth print process of printing, when a part of the changed calculation data falls within a predetermined range from a beginning of an entirety of the plurality of calculation data at least one of which is changed, an entire range of the plurality of calculation data including the changed calculation data.

6. The calculation data printing apparatus of claim 4, wherein any one of the first to third print processes is set as the process of causing the printer to print the second print data, in accordance with a user operation.

7. A calculation data printing method of an electronic apparatus including a print function, comprising:
inputting a plurality of calculation data in accordance with a user operation;
printing, as first print data, the plurality of calculation data, and calculation result data of the plurality of calculation data;
changing at least one of the plurality of calculation data in accordance with a user operation; and
printing, as second print data, at least one calculation data including the changed calculation data and calculation result data of the plurality of calculation data at least one of which is changed, without printing at least one of the plurality of calculation data printed as the first print data.

8. The calculation data printing method of claim 7, wherein the printing the second print data includes a first print process of printing, as the second print data, the changed calculation data, and calculation result data of the plurality of calculation data at least one of which is changed.

9. The calculation data printing method of claim 8, wherein the printing the second print data includes a second print process of printing, among the plurality of calculation data printed as the first print data, calculation data before the changed calculation data to calculation data after the changed calculation data, as the second print data.

10. The calculation data printing method of claim 9, wherein the printing the second print data includes a third print process of printing, among the plurality of calculation data at least one of which is changed, the changed calculation data and calculation data following the changed calculation data, as the second print data.

11. The calculation data printing method of claim 10, wherein the printing the second print data includes a fourth print process of printing, when a part of the changed calculation data falls within a predetermined range from a beginning of an entirety of the plurality of calculation data at least one of which is changed, an entire range of the plurality of calculation data including the changed calculation data.

12. The calculation data printing method of claim 10, further comprising setting, in accordance with a user operation, any one of the first to third print processes as a process of the printing the second print data.

13. A computer-readable non-transitory storage medium which stores a program for causing a computer of an electronic apparatus including a printer to execute:
a process of inputting a plurality of calculation data in accordance with a user operation;
a process of causing the printer to print, as first print data, the plurality of calculation data, and calculation result data of the plurality of calculation data;
a process of changing at least one of the plurality of calculation data in accordance with a user operation; and
a process of causing the printer to print, as second print data, at least one calculation data including the changed calculation data and calculation result data of the plurality of calculation data at least one of which is changed, without printing at least one of the plurality of calculation data printed as the first print data.

14. The non-transitory storage medium of claim 13, wherein the process of causing the printer to print the second print data includes a first print process of printing, as the second print data, the changed calculation data, and calculation result data of the plurality of calculation data at least one of which is changed.

15. The non-transitory storage medium of claim 14, wherein the process of causing the printer to print the second print data includes a second print process of printing, among the plurality of calculation data printed as the first print data, calculation data before the changed calculation data to calculation data after the changed calculation data, as the second print data.

16. The non-transitory storage medium of claim 15, wherein the process of causing the printer to print the second print data includes a third print process of printing, among the plurality of calculation data at least one of which is changed, the changed calculation data and calculation data following the changed calculation data, as the second print data.

17. The non-transitory storage medium of claim 16, wherein the process of causing the printer to print the second print data includes a fourth print process of printing, when a part of the changed calculation data falls within a predetermined range from a beginning of an entirety of the plurality of calculation data at least one of which is changed, an entire range of the plurality of calculation data including the changed calculation data.

18. The non-transitory storage medium of claim 16, wherein the program causes the computer to further execute:
a process of setting, in accordance with a user operation, any one of the first to third print processes as a process of the printing the second print data.

* * * * *